United States Patent Office.

PETER M. WALLOVER, OF SMITH'S FERRY, PENNSYLVANIA.

Letters Patent No. 98,211, dated December 21, 1869.

IMPROVED COMPOUND OIL FOR MIXING PAINTS.

The Schedule referred to in these Letters Patent and making part of the same.

To all whom it may concern:

Be it known that I, PETER M. WALLOVER, of Smith's Ferry, Beaver county, Pennsylvania, have invented a new and improved Paint-Oil; and I do hereby declare that the following is a full, clear, and exact description thereof, which will enable others skilled in the art to make and use the same.

The present invention relates to an oil for the mixing of paints, made from petroleum.

This oil is made from linseed-oil, petroleum, or rock-oil, reduced by distillation to 38° or 40° specific gravity, mixed together in or about the proportion of one to three. To every forty gallons of oil, add two gallons of liquid resin and two gallons of lacquer, which mix together while hot.

The oil produced as above described is as good in every respect as linseed, is easier worked, and requires no spirits of turpentine or any other drying-medium, and in cost is at least fifty per cent. less than linseed.

Having thus described my invention,

What I claim as new, and desire to secure by Letters Patent, is—

The combination of petroleum, linseed-oil, resin, and lacquer, in the proportions and by the process substantially as herein specified, for the uses and purposes set forth.

PETER M. WALLOVER.

Witnesses:
MILTON BROWN,
WILLIAM DAWSON.